US009652835B2

United States Patent
Yaguchi

(10) Patent No.: US 9,652,835 B2
(45) Date of Patent: May 16, 2017

(54) IMAGE PROCESSING DEVICE, INFORMATION STORAGE DEVICE, AND IMAGE PROCESSING METHOD

(71) Applicant: OLYMPUS CORPORATION, Shibuya-ku, Tokyo (JP)

(72) Inventor: Yoichi Yaguchi, Hino (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 14/669,447

(22) Filed: Mar. 26, 2015

(65) Prior Publication Data

US 2015/0199800 A1 Jul. 16, 2015

Related U.S. Application Data

(63) Continuation of application No. PCT/JP2013/075079, filed on Sep. 18, 2013.

(30) Foreign Application Priority Data

Sep. 27, 2012 (JP) ................................ 2012-214531

(51) Int. Cl.
*G06K 9/00* (2006.01)
*G06T 5/50* (2006.01)
(Continued)

(52) U.S. Cl.
CPC .......... *G06T 5/50* (2013.01); *G06F 17/30843* (2013.01); *G06K 9/00751* (2013.01);
(Continued)

(58) Field of Classification Search
CPC .... G06T 5/50; G06T 2207/30096; H04N 5/76
(Continued)

(56) References Cited

U.S. PATENT DOCUMENTS 5,473,369 A 12/1995 Abe
5,767,922 A 6/1998 Zabih et al.
(Continued)

FOREIGN PATENT DOCUMENTS

CN 102096917 A 6/2011
EP 2839770 A1 * 4/2012 ............... G06K 9/00
(Continued)

OTHER PUBLICATIONS

Truong, et al., "Video AbstractionL Systematic Review and Classification", ACM Transactions on Multimedia Computing Communications and Applications; vol. 3, No. 1, Article 3, Feb. 2007, pp. 1-37.*

(Continued)

*Primary Examiner* — Gregory F Cunningham
(74) *Attorney, Agent, or Firm* — Holtz, Holtz & Volek PC

(57) ABSTRACT

An image processing device includes an image sequence acquisition section that acquires an image sequence that includes a plurality of constituent images, and a processing section that performs an image summarization process that deletes some of the plurality of constituent images included in the image sequence to generate a summary image sequence, the processing section selecting a reference image and a determination target image from the plurality of constituent images, detecting an unnecessary area from the determination target image, calculating a loss area based on deformation information about the reference image and the determination target image, and the unnecessary area, the loss area being an area that is lost when the determination target image is deleted, and determining whether or not the determination target image can be deleted based on the calculated loss area.

11 Claims, 15 Drawing Sheets

(51) Int. Cl.
  *G06T 7/00*  (2017.01)
  *G06K 9/62*  (2006.01)
  *G06F 17/30*  (2006.01)
  *G06T 7/254*  (2017.01)
  *H04N 5/76*  (2006.01)

(52) U.S. Cl.
  CPC .......... *G06K 9/6203* (2013.01); *G06T 7/0014* (2013.01); *G06T 7/254* (2017.01); *G06K 2209/05* (2013.01); *G06T 2207/10016* (2013.01); *G06T 2207/10068* (2013.01); *G06T 2207/30028* (2013.01); *G06T 2207/30096* (2013.01); *H04N 5/76* (2013.01)

(58) Field of Classification Search
  USPC .......................................................... 382/128
  See application file for complete search history.

(56) References Cited

U.S. PATENT DOCUMENTS

| | | | |
|---|---|---|---|
| 6,389,168 | B2 | 5/2002 | Altunbasak et al. |
| 6,724,915 | B1 | 4/2004 | Toklu et al. |
| 2005/0046699 | A1 | 3/2005 | Oya et al. |
| 2006/0189843 | A1 | 8/2006 | Nakamura et al. |
| 2006/0257048 | A1* | 11/2006 | Lin .................... G06K 9/00711 382/276 |
| 2006/0291696 | A1 | 12/2006 | Shao et al. |
| 2007/0060798 | A1 | 3/2007 | Krupnik et al. |
| 2007/0171279 | A1 | 7/2007 | Hasegawa et al. |
| 2007/0195165 | A1 | 8/2007 | Hirakawa |
| 2008/0068454 | A1 | 3/2008 | Hirakawa |
| 2008/0212881 | A1 | 9/2008 | Hirakawa |
| 2009/0051695 | A1 | 2/2009 | Matsuda |
| 2009/0148014 | A1 | 6/2009 | Kanda |
| 2009/0309961 | A1 | 12/2009 | Miyashita |
| 2010/0067808 | A1 | 3/2010 | Matsuzaki |
| 2010/0097392 | A1 | 4/2010 | Nishiyama et al. |
| 2010/0119110 | A1 | 5/2010 | Kanda |
| 2010/0124365 | A1 | 5/2010 | Kanda |
| 2010/0183204 | A1 | 7/2010 | Kanda |
| 2010/0194992 | A1 | 8/2010 | Kouno |
| 2011/0311133 | A1 | 12/2011 | Hirota et al. |
| 2012/0008860 | A1 | 1/2012 | Hirota et al. |
| 2012/0020524 | A1 | 1/2012 | Ishikawa |
| 2014/0126789 | A1* | 5/2014 | Ban .................. G06T 7/0024 382/128 |

FOREIGN PATENT DOCUMENTS

| | | | | |
|---|---|---|---|---|
| JP | 2005124965 | A | | 5/2005 |
| JP | 2006296569 | A | | 11/2006 |
| JP | 2006320650 | A | | 11/2006 |
| JP | 2007313119 | A | | 12/2007 |
| JP | 2009005020 | A | | 1/2009 |
| JP | 2010158308 | A | * | 1/2009 .............. A61B 1/00 |
| JP | 2010183290 | A | * | 2/2009 .............. G06T 7/20 |
| JP | 2009050321 | A | | 3/2009 |
| JP | 2009508567 | A | | 3/2009 |
| JP | 2009297365 | A | | 12/2009 |
| JP | 2010094185 | A | | 4/2010 |
| JP | 2010113616 | A | | 5/2010 |
| JP | 2010115413 | A | | 5/2010 |
| JP | 2010158308 | A | | 7/2010 |
| JP | 2010183290 | A | | 8/2010 |
| JP | 2011024763 | A | | 2/2011 |
| JP | 2011175599 | A | | 9/2011 |
| JP | 2011234931 | A | | 11/2011 |
| JP | 2012016454 | A | | 1/2012 |
| WO | 2007032002 | A2 | | 3/2007 |
| WO | 2013133368 | A1 | | 9/2013 |
| WO | 2013133370 | A1 | | 9/2013 |
| WO | 2013157354 | A1 | | 10/2013 |

OTHER PUBLICATIONS

Kim, et al., "Object-based video abstraction for video surveillance systems", in IEEE Transactions on Circuits and Bystems for Video Technology, vol. 12, No. 12, pp. 1128-1138, Dec. 2002.*
International Search Report (ISR) dated Dec. 17, 2013 issued in International Application No. PCT/JP2013/075079.
U.S. Appl. No. 14/669,497, filed Mar. 26, 2015, First Named Inventor: Yoichi Yaguchi, Title: "Image Processing Device, Information Storage Device, and Image Processing Method".
Extended European Search Report dated Jun. 3, 2016, issued in European Application No. 13840399.3.
Chen, et al., "Trimming the Wireless Capsule Endoscopic Video by Removing Redundant Frames", 8th International Conference on Wireless Communications, Networking and Mobile Computing (WICOM 2012), Sep. 21, 2012, pp. 1-4.
Lee, et al., "Motion Analysis for Duplicate Frame Removal in Wireless Capsule Endoscope", Medical Imaging 2011: Image Processing, vol. 7962, No. 1, Mar. 3, 2011, pp. 1-8.
Chinese Office Action dated May 27, 2016 (and English translation thereof), issued in Chinese Application No. 201380050262.2.
Extended European Search Report dated Aug. 19, 2016, issued in counterpart European Application No. 13840346.4.
Li, et al., "An Overview of Video Abstraction Techniques", Jul. 31, 2001, pp. 1-23; Retrieved from the Internet: http://www.hpl.hp.com/techreports/2001/HPL-2001-191.pdf [retrieved on Jul. 19, 2016].
Truong, et al., "Video Abstraction: Systematic Review and Classification", ACM Transactions on Multimedia Computing Communications and Applications; vol. 3, No. 1, Article 3, Feb. 2007, pp. 1-37.
Kim, et al., "Object-based video abstraction for video surveillance systems", in IEEE Transactions on Circuits and Systems for Video Technology, vol. 12, No. 12, pp. 1128-1138, Dec. 2002.
Yilmaz, et al., "Object tracking: A survey", Acm computing surveys (CSUR) 38.4 (2006): 13.

\* cited by examiner

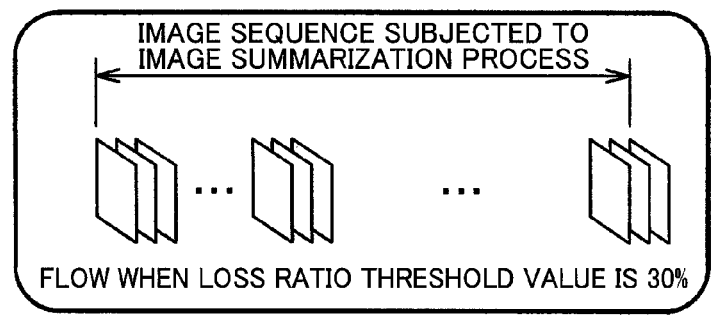
FIG. 9A
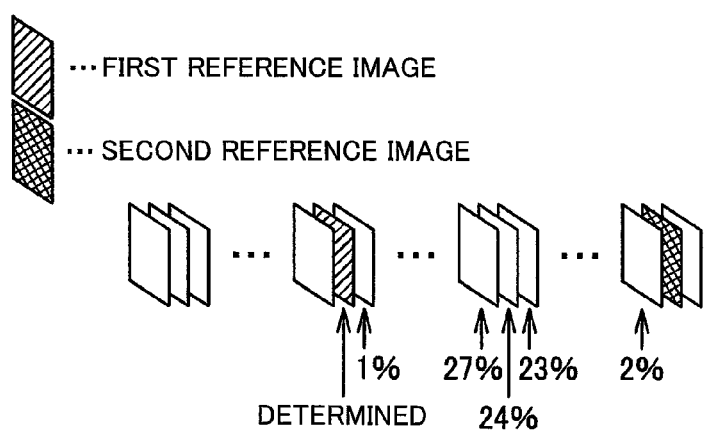
FIG. 9B
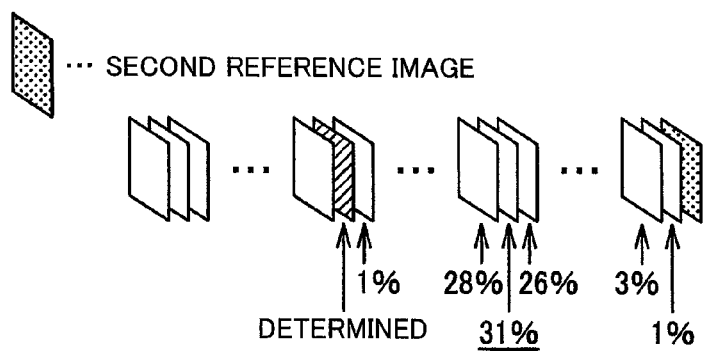

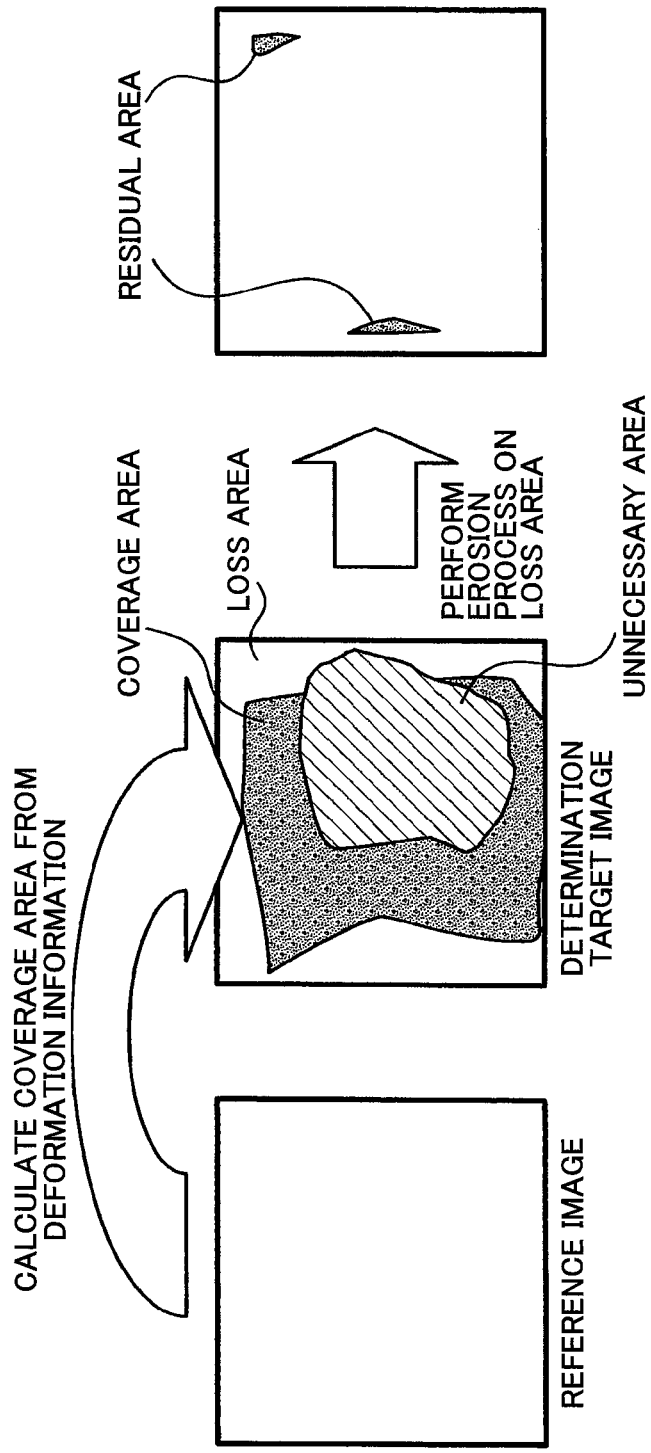

SUM AREA OF COVERAGE AREA AND UNNECESSARY AREA

IMAGE PROCESSING DEVICE, INFORMATION STORAGE DEVICE, AND IMAGE PROCESSING METHOD

CROSS REFERENCE TO RELATED APPLICATION

This application is a continuation of International Patent Application No. PCT/JP2013/075079, having an international filing date of Sep. 18, 2013, which designated the United States, the entirety of which is incorporated herein by reference. Japanese Patent Application No. 2012-214531 filed on Sep. 27, 2012 is also incorporated herein by reference in its entirety.

BACKGROUND

The present invention relates to an image processing device, an information storage device, an image processing method, and the like.

When still images are continuously captured in time series at given time intervals, or when a spatial object is covered by a number of images, or when a movie is captured, and each image included in the movie is used as a still image, for example, a very large number of temporally or spatially continuous images (hereinafter may be referred to as "image sequence") are acquired. In such a case, it is likely that the images that are closely situated within the image sequence (i.e., images that are close to each other temporally or spatially) are similar images, and it is not likely that it is necessary to check all of a large number of images in order to determine the captured information. Since the number of images may typically be tens of thousands or more, it takes time for the user to check all of the images.

Therefore, it has been desired to summarize the original image sequence using an image sequence that includes a smaller number of images by deleting some of the images from the original image sequence. This process is hereinafter referred to as "image summarization process". For example, JP-A-2009-5020 discloses an image summarization method that extracts a scene change boundary image included in the image sequence, or an image that represents the image sequence, and allows images from which the information represented by the image sequence can be easily determined, to remain.

For example, when applying the image summarization technique to the medical field, it is necessary to prevent a situation in which an area that cannot be observed occurs due to deletion of an image in order to prevent a situation in which a disease is missed. In particular, it is necessary to ensure that an important area such as a lesion area or an abnormal area can be reliably observed.

SUMMARY

According to one aspect of the invention, there is provided an image processing device comprising:

an image sequence acquisition section that acquires an image sequence that includes a plurality of constituent images; and a processing section that performs an image summarization process that deletes some of the plurality of constituent images included in the image sequence acquired by the image sequence acquisition section to generate a summary image sequence, the processing section selecting a reference image and a determination target image from the plurality of constituent images, detecting an unnecessary area from the determination target image, calculating a loss area based on deformation information about the reference image and the determination target image, and the unnecessary area, the loss area being an area that is lost when the determination target image is deleted, and determining whether or not the determination target image can be deleted based on the calculated loss area.

According to another aspect of the invention, there is provided an information storage device storing a program that causes a computer to function as:

an image sequence acquisition section that acquires an image sequence that includes a plurality of constituent images; and a processing section that performs an image summarization process that deletes some of the plurality of constituent images included in the image sequence acquired by the image sequence acquisition section to generate a summary image sequence, the processing section selecting a reference image and a determination target image from the plurality of constituent images, detecting an unnecessary area from the determination target image, calculating a loss area based on deformation information about the reference image and the determination target image, and the unnecessary area, the loss area being an area that is lost when the determination target image is deleted, and determining whether or not the determination target image can be deleted based on the calculated loss area.

According to another aspect of the invention, there is provided an image processing method comprising:

acquiring an image sequence that includes a plurality of constituent images;

selecting a reference image and a determination target image from the plurality of constituent images;

detecting an unnecessary area from the determination target image;

calculating a loss area based on deformation information about the reference image and the determination target image, and the unnecessary area, the loss area being an area that is lost when the determination target image is deleted;

determining whether or not the determination target image can be deleted based on the calculated loss area; and performing an image summarization process that deletes some of the plurality of constituent images included in the image sequence based on a result of the determination as to whether or not the determination target image can be deleted to acquire a summary image sequence.

BRIEF DESCRIPTION OF THE DRAWINGS

FIGS. 9A and 9B are views illustrating a deletion determination process using a first reference image and a second reference image.

FIG. 11 is a view illustrating a process according to a second embodiment.

DESCRIPTION OF EXEMPLARY EMBODIMENTS

Figure 1A:
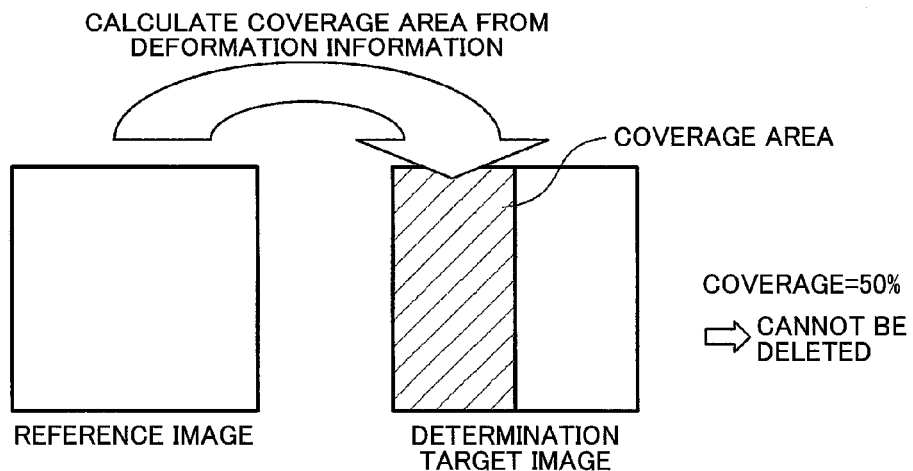
FIGS. 1A to 1C are views illustrating the difference between a case where an unnecessary area is taken into account, and a case where an unnecessary area is not taken into account.

According to one embodiment of the invention, there is provided an image processing device comprising:

an image sequence acquisition section that acquires an image sequence that includes a plurality of constituent images; and a processing section that performs an image summarization process that deletes some of the plurality of constituent images included in the image sequence acquired by the image sequence acquisition section to generate a summary image sequence, the processing section selecting a reference image and a determination target image from the plurality of constituent images, detecting an unnecessary area from the determination target image, calculating a loss area based on deformation information about the reference image and the determination target image, and the unnecessary area, the loss area being an area that is lost when the determination target image is deleted, and determining whether or not the determination target image can be deleted based on the calculated loss area.

According to one embodiment of the invention, the loss area is calculated based on the deformation information about the reference image and the determination target image, and the unnecessary area, and whether or not the determination target image can be deleted is determined based on the calculated loss area. Since an area that is not covered by the reference image, and is desirably covered (i.e., is not unnecessary) can be calculated to be the loss area by taking account of the unnecessary area, it is possible to appropriately determine whether or not the determination target image can be deleted, for example.

In the image processing device, the processing section may calculate a coverage area based on the deformation information about the reference image and the determination target image, the coverage area being an area in which the determination target image is covered by the reference image, and may calculate an area of the determination target image that is not included in the coverage area and the unnecessary area to be the loss area.

This makes it possible to calculate an area of the determination target image that is not included in the coverage area and the unnecessary area to be the loss area, and utilize the calculated area when determining whether or not the determination target image can be deleted.

In the image processing device, the processing section may calculate a loss ratio based on the loss area, the loss ratio representing a ratio of an area that is lost when the determination target image is deleted, and may determine whether or not the determination target image can be deleted based on the calculated loss ratio.

This makes it possible to determine whether or not the determination target image can be deleted based on the loss ratio, for example.

In the image processing device, the processing section may calculate a ratio of the loss area with respect to the determination target image to be the loss ratio.

This makes it possible to calculate the ratio of the loss area with respect to the determination target image to be the loss ratio.

In the image processing device, the processing section may determine probability that an attention area included in the determination target image is missed using the loss area, and may determine whether or not the determination target image can be deleted based on the probability that the attention area is missed.

This makes it possible to determine whether or not the determination target image can be deleted from the viewpoint of the probability that the attention area is missed taking account of the relationship with the loss area, for example.

In the image processing device, the processing section may determine the probability that the attention area included in the determination target image is missed by determining whether or not an area having a size corresponding to the attention area is included within the loss area.

This makes it possible to determine the probability that the attention area is missed based on whether or not an area having a size corresponding to the attention area is included within the loss area.

In the image processing device, the processing section may perform a erosion process that utilizes a structural element that corresponds to the attention area on the loss area, may determine that the determination target image cannot be deleted when it has been determined by the erosion process that a residual area is present, and the attention area may be missed, and may determine that the determination target image can be deleted when it has been determined by the erosion process that the residual area is not present, and the attention area is not missed.

This makes it possible to perform the erosion process that utilizes the structural element on the loss area, and determine whether or not the determination target image can be deleted based on whether or not the residual area is present, for example.

In the image processing device, the image sequence may be an in vivo image sequence obtained by capturing inside of a living body, and the processing section may detect a bubble area or a residue area included in the determination target image as the unnecessary area.

This makes it possible to detect a bubble area or a residue area included in an in vivo image as the unnecessary area.

In the image processing device, the processing section may detect a dark area or a halation area included in the determination target image as the unnecessary area.

This makes it possible to detect a dark area or a halation area as the unnecessary area.

Another embodiment of the invention relates to an information storage device storing a program that causes a computer to function as each section described above.

According to another embodiment of the invention, there is provided an image processing method comprising:

acquiring an image sequence that includes a plurality of constituent images;

selecting a reference image and a determination target image from the plurality of constituent images;

detecting an unnecessary area from the determination target image;

calculating a loss area based on deformation information about the reference image and the determination target image, and the unnecessary area, the loss area being an area that is lost when the determination target image is deleted;

determining whether or not the determination target image can be deleted based on the calculated loss area; and performing an image summarization process that deletes some of the plurality of constituent images included in the image sequence based on a result of the determination as to whether or not the determination target image can be deleted to acquire a summary image sequence.

Exemplary embodiments of the invention are described below. Note that the following exemplary embodiments do not in any way limit the scope of the invention laid out in the claims. Note also that all of the elements described in connection with the following exemplary embodiments should not necessarily be taken as essential elements of the invention.

1. Method

A method used in connection with several exemplary embodiments of the invention is described below. It is desirable to perform the image summarization process when an image sequence that includes a large number of temporally or spatially continuous images has been acquired, and the user performs a process (e.g., medical practice (e.g., diagnosis) when the image sequence is an endoscopic image sequence) using the image sequence. This is because the number of images included in the image sequence is very large, and it takes time for the user to check all of the images included in the image sequence to make a determination. Moreover, it is likely that similar images are included in the image sequence, and the amount of information that can be acquired is limited even if such similar images are thoroughly checked.

Specific examples of such an image sequence include an image sequence captured using a capsule endoscope. The capsule endoscope is a capsule-shaped endoscope that includes a small camera, and captures an image at given time intervals (e.g., twice a second). Since the capsule endoscope remains inside a body for several hours (tens or more hours in some cases) until it is discharged from the body, several tens of thousands of captured images are acquired during a single examination. When the capsule endoscope moves inside a living body, the capsule endoscope may stop, or move backward, due to the motion of the living body, for example. Therefore, a large number of captured images may include a number of images that capture a similar object, and are not useful for finding a lesion or the like.

A known image summarization process may extract a scene change boundary image or an image that represents the image sequence. However, such a known image summarization process deletes an image without taking account of the relationship between the object captured within the deletion target image and the object captured within the image that is allowed to remain. Therefore, the object that is captured within an image included in the original image sequence may not be captured within each image included in the image sequence obtained by the image summarization process. Since the degree of occurrence of a situation in which the object that is captured within an image included in the original image sequence is not included in each image included in the image sequence obtained by the image summarization process, depends on the processing target image sequence, it is difficult to control the degree of occurrence of such an object using a known method.

This is particularly undesirable when applying the image summarization process to the medical field. This is because it is necessary to prevent a situation in which the attention area (e.g., lesion) is missed as much as possible. In order to prevent a situation in which the attention area is missed, it is desirable to capture a wide range inside a living body, and prevent a situation in which an object range that cannot be observed occurs due to deletion of a given image during the image summarization process.

In order to solve the above problems, several embodiments of the invention propose a method that selects a reference image (i.e., an image that is allowed to remain (an image that may be allowed to remain depending on the embodiment)) and a determination target image (i.e., a deletion determination target image), and performs the image summarization process based on deformation information about the reference image and the determination target image.

Figure 17:
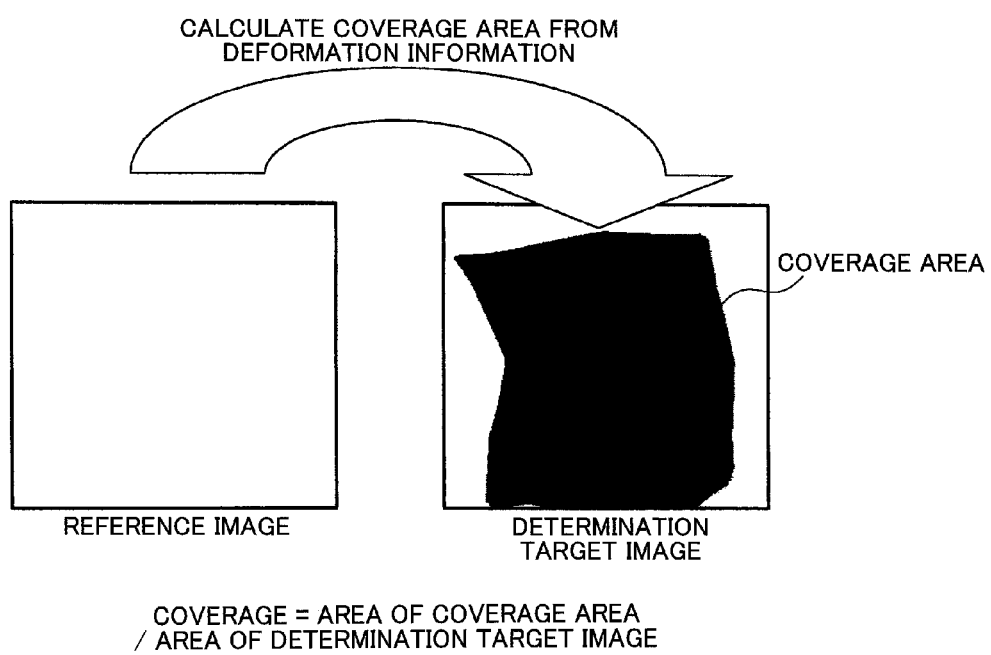
FIG. 17 is a view illustrating a method that calculates a coverage based on a coverage area.

For example, the image summarization process that utilizes the deformation information may calculate a coverage area within the determination target image by deforming the reference image (see FIG. 17). In this case, the object captured within the reference image corresponds to the object captured within the coverage area included in the determination target image. Specifically, an area (hereinafter referred to as "non-coverage area") of the determination target image that is not included in the coverage area cannot be covered by the reference image when the determination target image is deleted.

Therefore, the degree by which an object range that cannot be observed occurs is controlled by calculating the ratio of the coverage area with respect to the determination target image as a coverage, and determining whether or not to delete the determination target image based on the calculated coverage, for example. For example, the determination target image is deleted when the coverage is equal to or larger than a threshold value, and is not deleted when the coverage is less than the threshold value. In this case, the degree by which an area that cannot be covered occurs can be controlled by appropriately setting the threshold value.

The image summarization process that utilizes the deformation information may determine whether or not the determination target image can be deleted based on the results of a erosion process that is performed on the non-coverage area using a structural element (corresponding to an attention area). The erosion process is illustrated in FIGS. 12A to 12F. Note that the erosion process illustrated in FIGS. 12A to 12F is not performed on the non-coverage area. The details of the erosion process are described later. In this case, at least part of an area captured within the determination target image having a size equal to or larger than that of the structural element is necessarily captured within the reference image even if the determination target image is deleted. Therefore, when the entire attention area is captured within the determination target image, at least part of the attention area can be observed within the reference image irrespective of the position of the attention area within the determination target image, and a situation in which the attention area is missed can be prevented.

However, when an unnecessary area is present within the determination target image, the image summarization process based on the coverage area may be inefficient (i.e., an image that need not be allowed to remain may remain in the image sequence obtained by the image summarization process). The term "unnecessary area" used herein refers to an area in which an object that is unnecessary for a process performed using the acquired image is captured, or an area in which the object is not sufficiently captured (e.g., dark area or halation area). An object that is unnecessary for the process performed using the image differs depending on the process performed using the image. For example, when the image is an in vivo image captured using an endoscope apparatus, it is considered that bubbles and a residue are unnecessary for the process performed using the image. Specifically, when diagnosis or the like is performed using an in vivo image, it is considered that the observation target is a mucous membrane on the surface of tissue, a blood vessel structure, or the like, and it is unlikely that bubbles and a residue are important. In such a case, a bubble area of the image in which bubbles are captured, or a residue area of the image in which a residue is captured, is determined to be the unnecessary area. Note that bubbles or the like may be the observation target depending on the object of observation. In such a case, the bubble area or the like is not determined to be the unnecessary area.

The advantages achieved by taking account of the unnecessary area are described below with reference to FIGS. 1A to 1C. Note that an extreme shape is used in FIGS. 1A to 1C for convenience of explanation. FIG. 1A illustrates a coverage area obtained by deforming the reference image using the deformation information, and projecting the deformed reference image onto the determination target image. In FIG. 1A, the coverage is 50% (i.e., 50% of the object captured within the determination target image is captured within the reference image). This means that it may be impossible to observe 50% of the determination target image when the determination target image is deleted, even if the reference image is allowed to remain. For example, when a coverage threshold value used for the deletion determination process is set to 70% (i.e., when a situation in which up to 30% of the object cannot be observed is allowed), it is determined that the determination target image cannot be deleted in the example illustrated in FIG. 1A.

Figure 1B:
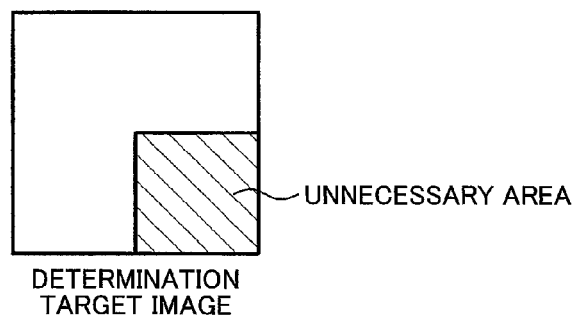

However, when the unnecessary area is present within the determination target image as illustrated in FIG. 1B, no problem occurs even if the unnecessary area cannot be observed due to deletion of the determination target image, since a valuable object is not captured within the unnecessary area. In other words, it is unnecessary to determine that the determination target image cannot be deleted only for the reason that the unnecessary area is not covered by the reference image (i.e., the unnecessary area is not included in the coverage area).

Figure 1C:
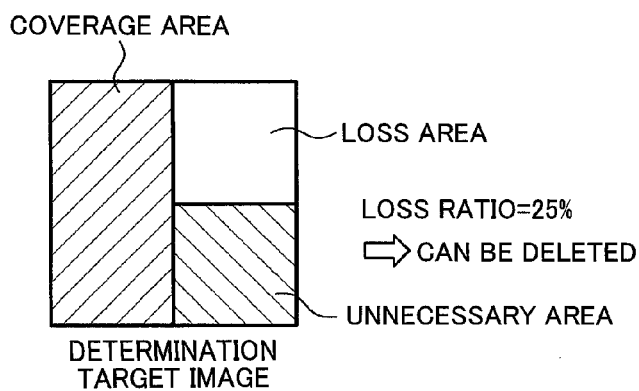

FIG. 1C illustrates an example in which the determination target image includes the coverage area and the unnecessary area. In this case, since the object that corresponds to the coverage area is captured within the reference image, the object captured within the coverage area can be observed within the reference image even if the determination target image is deleted. The unnecessary area is an area for which no problem occurs even if it cannot be observed due to deletion of the determination target image. Specifically, the loss area illustrated in FIG. 1C is an area for which a problem may occur if it cannot be observed due to deletion of the determination target image.

It may be determined that the determination target image illustrated in FIGS. 1A to 1C cannot be deleted when only the coverage area is taken into account (see FIG. 1A). However, it may be determined that the determination target image can be deleted when the unnecessary area is also taken into account (see FIG. 1C), since the object area to be lost due to deletion of the determination target image is 25% of the determination target image. Therefore, the ratio of the loss area with respect to the determination target image is defined as "loss ratio", and whether or not the determination target image can be deleted is determined based on the loss ratio. This makes it possible to appropriately determine that the determination target image can be deleted, even when it is determined that the determination target image cannot be deleted using the determination process based on the coverage (see FIGS. 1A to 1C). Since this increases the probability that it is determined that the determination target image can be deleted, it is possible to improve the effect of reducing the number of images, and allow the user to easily perform diagnosis or the like.

This also applies to the erosion process that utilizes the structural element. The erosion process that utilizes the structural element determines whether or not the entirety of the attention area (e.g., lesion) having a given size and a given shape is included within an area that is lost when the determination target image is deleted (e.g., the non-coverage area when only the coverage area is taken into account). When the attention area is included within an area that is lost when the determination target image is deleted, the entirety of the attention area that is captured within the determination target image may be lost (i.e., may not remain in the reference image) when the determination target image is deleted.

However, since the unnecessary area is a bubble area or the like (see above), the attention area (e.g., lesion) is not included within the unnecessary area. Therefore, it is unnecessary to perform the erosion process on the entire non-coverage area. Specifically, it suffices to perform the erosion process on only an area of the non-coverage area in which the attention area may be captured (i.e., an area of the non-coverage area other than the unnecessary area (=loss area illustrated in FIG. 1C)). Specifically, the loss area may be calculated in the same manner as in the case of calculating the loss ratio instead of the coverage, and the process that utilizes the structural element may be performed on the calculated loss area.

Since the size of the loss area is equal to or smaller than that of the non-coverage area, the probability that the attention area is included within the loss area is lower than the probability that the attention area is included within the non-coverage area. Therefore, it is possible to increase the probability that it is determined that the determination target image can be deleted, and improve the effect of reducing the number of images.

Figure 16:
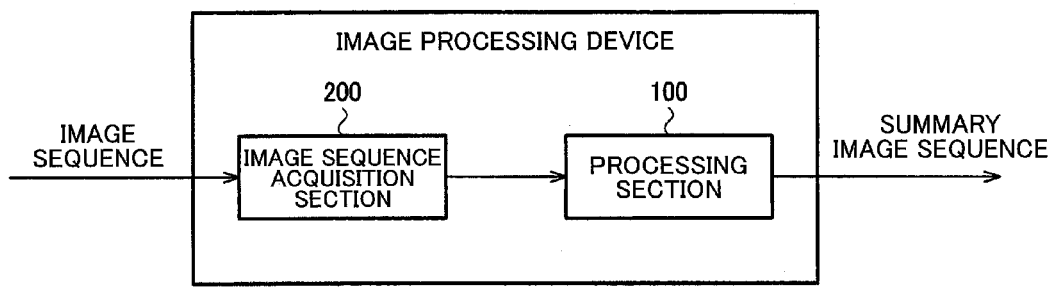
FIG. 16 illustrates a basic configuration example of an image processing device.

An image processing device according to one embodiment of the invention may include a processing section 100 and an image sequence acquisition section 200 (see FIG. 16). The image sequence acquisition section 200 acquires an image sequence that includes a plurality of constituent images. The processing section 100 performs an image summarization process that deletes some of the plurality of constituent images included in the image sequence acquired by the image sequence acquisition section 200 to generate a summary image sequence. The processing section 100 selects the reference image and the determination target image from the plurality of constituent images, detects the unnecessary area from the determination target image, calculates the loss area of the determination target image with respect to the reference image based on the deformation information about the reference image and the determination target image, and the unnecessary area, and determines whether or not the determination target image can be deleted based on the calculated loss area.

A first embodiment illustrates a method that determines whether or not the determination target image can be deleted based on the loss ratio. A second embodiment illustrates a method that determines whether or not the determination target image can be deleted based on the erosion process that utilizes the structural element.

2. First Embodiment

The method that determines whether or not the determination target image can be deleted based on the loss ratio is described below. A system configuration example of the image processing device will be described first, and the flow of the process will then be described using a flowchart.

2.1 System Configuration Example

Figure 2:
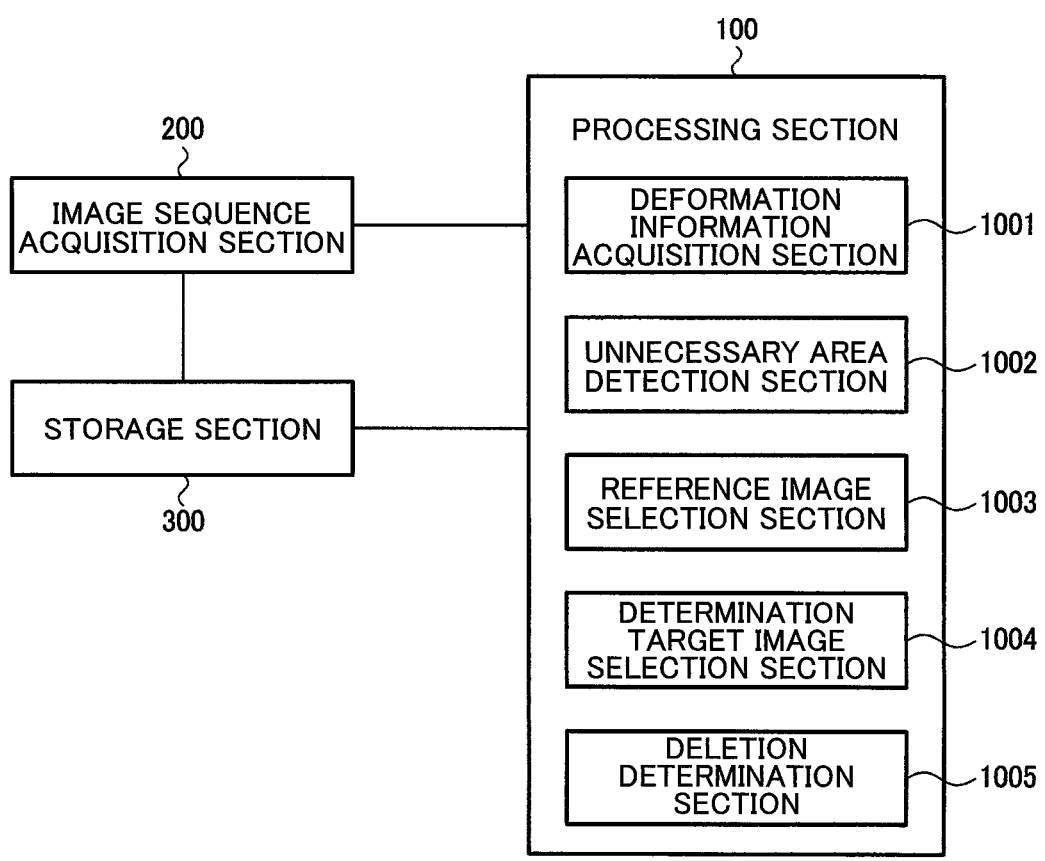
FIG. 2 illustrates a configuration example of an image processing device.

FIG. 2 illustrates a system configuration example of the image processing device according to the first embodiment. The image processing device includes a processing section 100, an image sequence acquisition section 200, and a storage section 300.

The processing section 100 performs the image summarization process that deletes some of a plurality of images included in an image sequence acquired by the image sequence acquisition section 200. The function of the processing section 100 may be implemented by hardware such as a processor (e.g., CPU) or an ASIC (e.g., gate array), a program, or the like.

The image sequence acquisition section 200 acquires the image sequence that is subjected to the image summarization process. The image sequence acquired by the image sequence acquisition section 200 may include RGB channel images that are arranged in time series. Alternatively, the image sequence acquired by the image sequence acquisition section 200 may be a spatially continuous image sequence (e.g., an image sequence that includes spatially arranged images that have been captured using imaging devices arranged in a row). Note that the images included in the image sequence are not limited to RGB channel images. Another color space (e.g., Gray channel image) may also be used.

The storage section 300 stores the image sequence acquired by the image sequence acquisition section 200, and serves as a work area for the processing section 100 and the like. The function of the storage section 300 may be implemented by a memory (e.g., RAM), a hard disk drive (HDD), or the like.

The processing section 100 may include a deformation information acquisition section 1001, an unnecessary area detection section 1002, a reference image selection section 1003, a determination target image selection section 1004, and a deletion determination section 1005 (see FIG. 2). Note that the configuration of the processing section 100 is not limited to the configuration illustrated in FIG. 2. Various modifications may be made, such as omitting some of the elements illustrated in FIG. 2, or adding other elements. Note that each section illustrated in FIG. 2 is provided to describe each subroutine when the image summarization process performed by the processing section 100 is divided into a plurality of subroutines. The processing section 100 does not necessarily include each section illustrated in FIG. 2 as an element.

The deformation information acquisition section 1001 acquires the deformation information about two images. The deformation information represents a shape (range) in which the range captured within one image is captured within the other image. The deformation information may be the deformation parameter disclosed in JP-A-2011-24763, for example. When determining whether or not the determination target image can be deleted, the deformation information acquisition section 1001 acquires the deformation information about the reference image selected by the reference image selection section 1003 and the determination target image selected by the determination target image selection section 1004, and the deletion determination process is performed based on the acquired deformation information.

Note that the deformation information acquisition section 1001 need not necessarily directly calculate the deformation information about the reference image and the determination target image. For example, the deformation information about contiguous images included in the processing target image sequence may be calculated, and the deformation information about non-contiguous images may be calculated by combining the deformation information about contiguous images. In this case, the deformation information about the reference image and the determination target image is calculated by combining the deformation information (all pieces of deformation information in a narrow sense) about the reference image, the determination target image, and contiguous images between the reference image and the determination target image.

This makes it possible to reduce the processing load when performing the deformation information calculation process. Specifically, the deformation information can be calculated using the method disclosed in JP-A-2011-24763, for example. The processing load is normally very light when performing a process that combines a plurality of pieces of deformation information as compared with a process that calculates the deformation information from the beginning. For example, when the deformation information is a matrix, the processing load is heavy when performing a process that calculates the matrix from two pieces of image information, while it is very easy to synthesize a plurality of matrices calculated in advance (since it suffices to calculate the product of the matrices, for example).

For example, when the image sequence acquired by the image sequence acquisition section 200 includes N images, two images can be selected from the image sequence in $N \times (N-1)/2$ combinations. Therefore, when directly calculating the deformation information about the reference image and the determination target image, the heavy-load process that calculates the deformation information from the beginning may be performed $N^2$ times. On the other hand, it suffices to perform the heavy-load process $N-1$ times when using the deformation information about contiguous images.

The unnecessary area detection section 1002 detects the unnecessary area from each image included in the acquired image sequence. Examples of the unnecessary area include a bubble area, a residue area, a dark area, and a halation area. Note that the term "dark area" used herein refers to an area in which blocked-up shadows occur. For example, the term "dark area" used herein refers to an area that includes pixels having a brightness value (calculated from RGB pixel values) smaller than a given threshold value. The term "halation area" used herein refers to an area in which blown-out highlights occur. For example, the term "halation area" used herein refers to an area that includes pixels having a brightness value (calculated from RGB pixel values) larger than a given threshold value.

The bubble area, the residue area, the dark area, and the halation area may be detected in various ways. For example, the bubble area, the residue area, the dark area, and the halation area may be detected using the methods disclosed in Patent Documents 3 to 6, respectively. Note that only one of the bubble area, the residue area, the dark area, and the halation area may be detected (used) as the unnecessary area, or a plurality of areas among the bubble area, the residue area, the dark area, and the halation area may be detected (used) in combination as the unnecessary area. In the latter case, the sum (total) area of these areas may be detected (used) as the unnecessary area. Note that the sum area of an area A and an area B included in an image refers to an area that is a set of pixels that form the image and are included in at least one of the area A and the area B.

The reference image selection section 1003 selects the reference image from a plurality of images included in a partial image sequence. The determination target image selection section 1004 selects an image among the plurality of images included in the partial image sequence that differs from the reference image as the determination target image.

The deletion determination section 1005 determines whether or not the determination target image can be deleted based on the deformation information about the reference image and the determination target image, and the unnecessary area. In the first embodiment, the deletion determination section 1005 determines whether or not the determination target image can be deleted based on the loss ratio that represents the ratio of an area that is lost when the determination target image is deleted.

Figure 3:
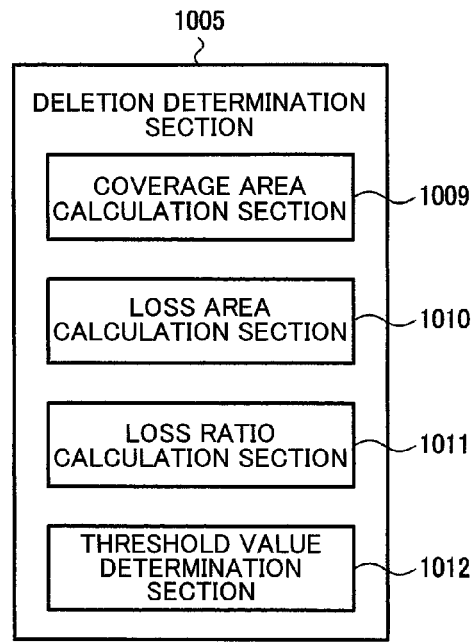
FIG. 3 illustrates a configuration example of a deletion determination section.

The deletion determination section 1005 may include a coverage area calculation section 1009, a loss area calculation section 1010, a loss ratio calculation section 1011, and a threshold value determination section 1012 (see FIG. 3). Note that the configuration of the deletion determination section 1005 is not limited to the configuration illustrated in FIG. 3. Various modifications may be made, such as omitting some of the elements illustrated in FIG. 3, or adding other elements.

The coverage area calculation section 1009 projects the reference image onto the determination target image by utilizing the deformation information (deformation parameter) about the reference image and the determination target image to calculate the coverage area.

Figure 4:
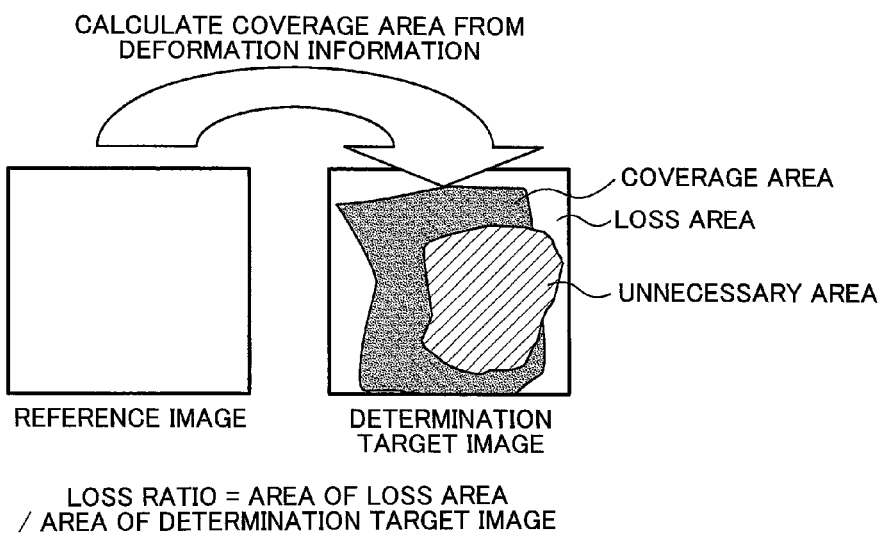
FIG. 4 is a view illustrating a process according to a first embodiment.

The loss area calculation section 1010 calculates the loss area from the coverage area and the unnecessary area. FIGS. 1A to 1C illustrate an example in which the coverage area does not overlap the unnecessary area. Note that the loss area can be calculated similarly even when the coverage area overlaps the unnecessary area. Specifically, an area of the determination target image that is not included in the coverage area and the unnecessary area is determined to be the loss area (see FIG. 4).

The loss ratio calculation section 1011 calculates the loss ratio based on the loss area. Specifically, the loss ratio calculation section 1011 calculates the area ratio of the loss area to the determination target image as the loss ratio. The number of pixels included in each area may be calculated directly as each area.

The threshold value determination section 1012 compares the calculated loss ratio with a given threshold value. The loss ratio is an index value that represents the ratio of an area of the object that is lost when the determination target image is deleted. Therefore, it is determined that the determination target image cannot be deleted when the loss ratio is larger than the threshold value, and it is determined that the determination target image can be deleted when the loss ratio is smaller than the threshold value. More specifically, it is determined that the determination target image can be deleted when the loss ratio is smaller than a given threshold value Th, and it is determined that the determination target image cannot be deleted when the loss ratio is equal to or larger than the threshold value Th.

2.2 Flow of Process

Figure 5:
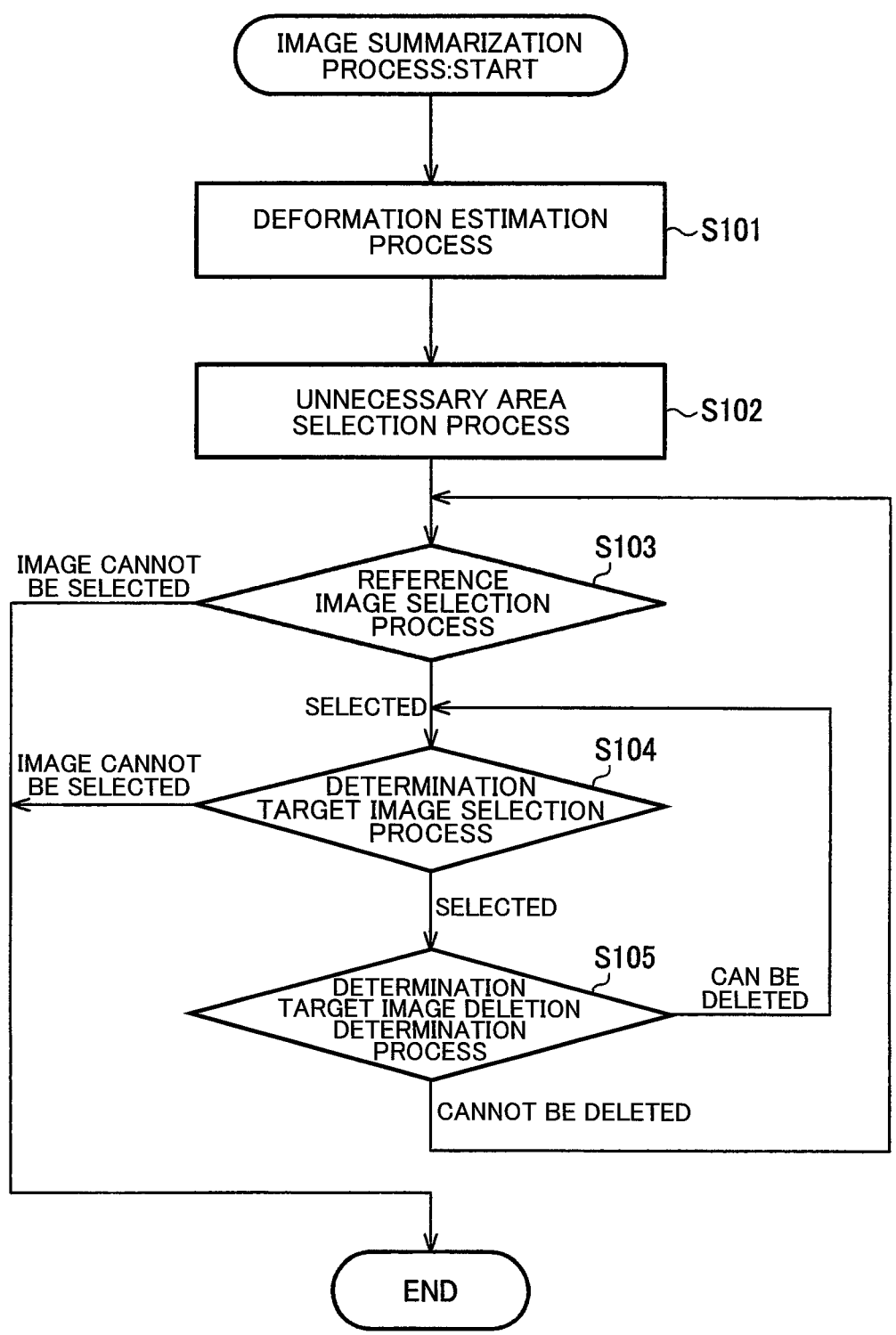
FIG. 5 is a flowchart illustrating an image summarization process according to one embodiment of the invention.

The flow of the image summarization process according to the first embodiment is described below with reference to FIG. 5 (flowchart). A deformation estimation process is performed in a step S101. The deformation estimation process corresponds to the process that calculates the deformation information about two contiguous images (see above).

The unnecessary area is detected from each image included in the acquired image sequence (S102). When detecting a plurality of areas as the unnecessary area, the sum area thereof may be calculated (see above).

The reference image is selected from the image sequence (S103). When the step S103 is performed for the first time, the first image included in the image sequence may be selected as the reference image. When the step S103 is performed for the second or subsequent time (i.e., when the step S103 is performed after the step S105), the determination target image that has been determined to be allowed to remain by the deletion determination process performed in the step S105 is selected as the next reference image. The selected reference image is allowed to remain in the summary image sequence. Note that the image summarization process is terminated when the reference image cannot be selected from the partial image sequence due to an error or the like.

When the reference image has been selected, the determination target image is selected from the images included in the image sequence (S104). The determination target image is selected from the images that follow the reference image in the image sequence. More specifically, when the step S104 is performed for the first time after the reference image has been selected or updated in the step S103, the image that immediately follows the reference image is selected as the determination target image. When the kth image from the reference image has been selected as the determination target image, the (k+1)th image from the reference image (i.e., the selection position is shifted by 1) is selected as the next determination target image. When the deletion determination process has been performed on the last image included in the image sequence, the determination target image cannot be selected in the step S104. In this case, the image summarization process is terminated.

When the reference image and the determination target image have been selected, whether or not the determination target image can be deleted is determined based on the deformation information about the reference image and the determination target image calculated in the step S101 (or acquired by combining a plurality of pieces of deformation information calculated in the step S101), and the unnecessary area detected in the step S102 (S105).

Figure 6:
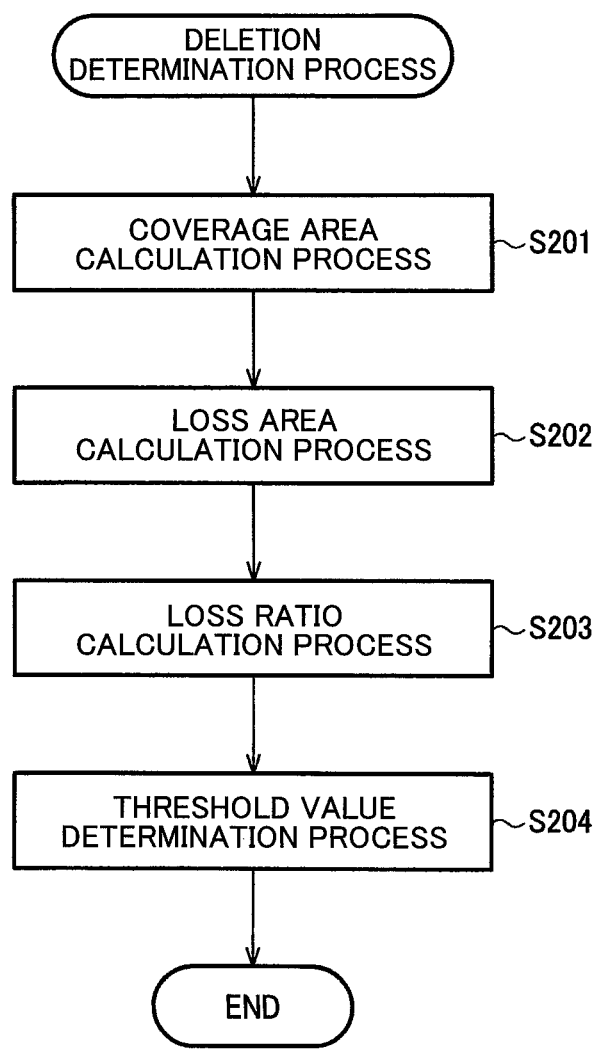
FIG. 6 is a flowchart illustrating a deletion determination process.

The flow of the deletion determination process performed in the S105 is described below with reference to FIG. 6

(flowchart). The reference image is deformed using the deformation information (deformation parameter) to calculate the coverage area (S201). An area of the determination target image that is not included in the coverage area and the unnecessary are is calculated to be the loss area (S202), and the ratio of the loss area with respect to the determination target image is calculated as the loss ratio (S203). The calculated loss ratio is compared with a given threshold value (S204) to determine whether or not the determination target image can be deleted.

When it has been determined that the determination target image can be deleted in the step S105, the determination target image is updated in the step S104. When it has been determined that the determination target image cannot be deleted (i.e., when the determination target image cannot be covered by the reference image) in the step S105, it is necessary to allow the determination target image to remain in the summary image sequence. Therefore, the determination target image that has been determined to be allowed to remain in the step S105 is selected as the next reference image in the step S103.

Figure 7A:
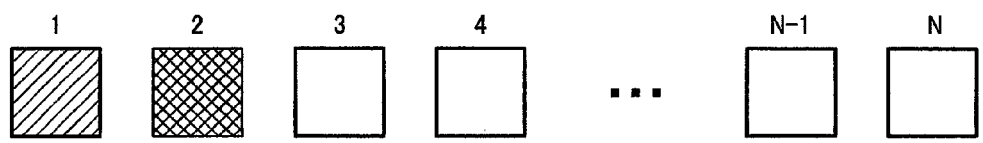
FIGS. 7A to 7C are views illustrating a reference image/determination target image selection method.
Figure 7B:
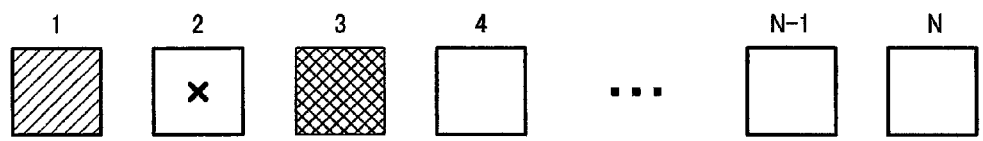
Figure 7C:
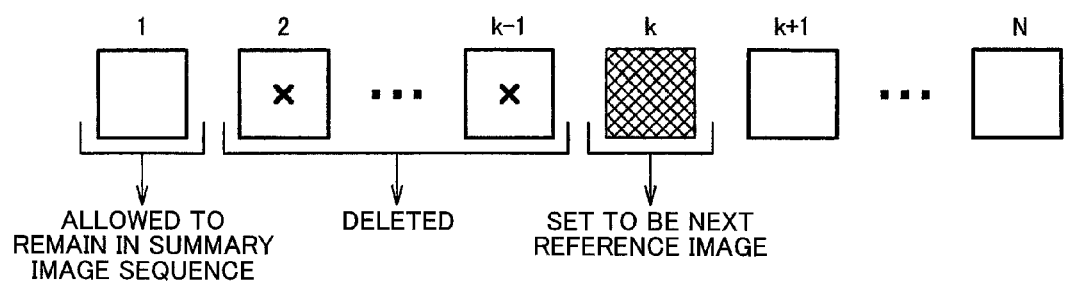

FIGS. 7A to 7C illustrate the image summarization process that is performed on the image sequence as described above. As illustrated in FIG. 7A, the image sequence includes N images. The first image included in the image sequence is selected as the reference image, and the second image included in the image sequence is selected as the determination target image. The loss ratio is calculated using the reference image and the determination target image, and whether or not the determination target image can be deleted is determined.

When it has been determined that the determination target image can be deleted, the next determination target image is selected. Specifically, the third image is selected as the determination target image (i.e., the position of the determination target image is shifted to the subsequent image) (see FIG. 7B). Whether or not the determination target image can be deleted is determined using the reference image and the selected determination target image, and the determination target image is updated until it is determined that the determination target image cannot be deleted.

When it has been determined that the second to (k−1)th images can be deleted (i.e., the object included in each of the second to (k−1)th images is covered by the reference image to the extent set based on the threshold value), and the kth image cannot be deleted (see FIG. 7C), the second to (k−1)th images are deleted (i.e., the second to (k−1)th images are not allowed to remain in the summary image sequence). Since most of the object included in the kth image is lost when the kth image is deleted even if the reference image is allowed to remain in the summary image sequence, it is necessary to allow the kth image to remain in the summary image sequence. Therefore, the kth image is set to be the next reference image.

When the next reference image has been selected, the image that immediately follows the selected reference image is selected as the determination target image, and the process illustrated in FIGS. 7A to 7C is performed. The subsequent process is performed in the same manner as described above. When it has been determined that the determination target image can be deleted, the subsequent image is selected as the determination target image. When it has been determined that the determination target image cannot be deleted, the determination target image that cannot be deleted is selected as the reference image. When the deletion determination process has been performed on all of the images included in the image sequence, the process is terminated.

2.3 Modifications

Figure 8:
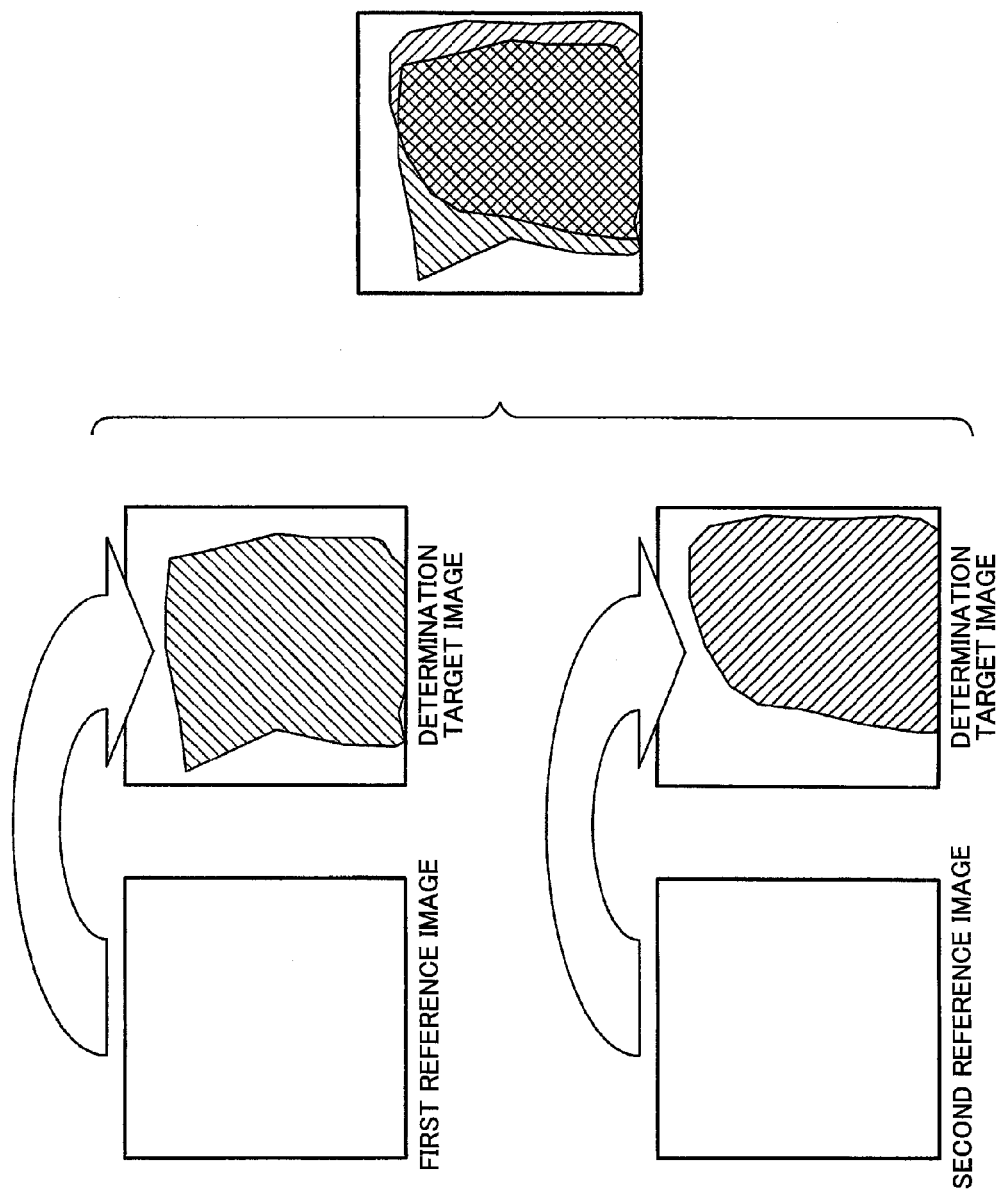
FIG. 8 is a view illustrating a process that calculates a coverage area based on a plurality of reference images.

The reference image/determination target image selection method may be modified in various ways. For example, a plurality of reference images may be selected. In this case, an area of the determination target image that is covered by a reference image among the plurality of reference images is not lost even when the determination target image is deleted. Therefore, an area that corresponds to the sum set of an area calculated by deforming each reference image may be used as the coverage area (see FIG. 8). The loss area calculation process, the loss ratio calculation process, and the determination process using the threshold value after calculating the coverage area are performed in the same manner as described above.

A plurality of reference images may be selected by selecting one reference image that precedes the determination target image, and selecting one reference image that follows the determination target image (two reference images in total) (see FIGS. 9A and 9B). In this case, the images between the two reference images are sequentially selected as the determination target image. When it has been determined that all of the images between the two reference images can be deleted, the two reference images are allowed to remain in the summary image sequence, and the images between the two reference images are deleted. This makes it possible to implement the deletion determination process that ensures that the degree by which the object is lost due to deletion of an image is equal to or lower than a given value.

When performing the deletion determination process taking account of a reduction in the number of summary images, a position may be searched that satisfies the conditions whereby all of the images between the first reference image (forward reference image) and the second reference image (backward reference image) can be deleted, and the first reference image and the second reference image are situated farthest from each other. In this case, when the first reference image has been determined, the value k is searched that satisfies the conditions whereby all of the images between the first reference image and the second reference image can be deleted when the kth image is selected as the second reference image, and at least one of the images between the first reference image and the second reference image cannot be deleted when the (k+1)th image is selected as the second reference image (see FIGS. 9A and 9B). When the value k that satisfies the above conditions has been found, the kth image is selected as the next first reference image, and the second reference image is selected from the images that follow the kth image (first reference image). The deletion determination process is performed while sequentially selecting the images between the first reference image and the second reference image as the determination target image, and the process is performed that searches the next second reference image that satisfies the conditions whereby all of the images between the first reference image and the second reference image can be deleted, and the first reference image and the second reference image are situated farthest from each other. When using this method, the second reference image is a candidate for an image that is allowed to remain in the summary image sequence, while the first reference image is necessarily allowed to remain in the summary image sequence.

Note that the reference image and the determination target image may be selected using various other methods.

According to the first embodiment, the image processing device includes the image sequence acquisition section 200 that acquires an image sequence that includes a plurality of constituent images, and the processing section 100 that performs the image summarization process that deletes some of the plurality of constituent images included in the image sequence acquired by the image sequence acquisition section 200 to generate a summary image sequence (see FIG. 2). The processing section 100 selects the reference image and the determination target image from the plurality of constituent images, and detects the unnecessary area from the determination target image. The processing section 100 calculates the loss area (i.e., an area that is lost when the determination target image is deleted) based on the deformation information about the reference image and the determination target image, and the unnecessary area, and determines whether or not the determination target image can be deleted based on the calculated loss area.

The term "unnecessary area" used herein refers to an area within an image that is unnecessary for a process that uses an image included in an image sequence (e.g., diagnosis performed by a doctor when the image is an in vivo image captured using an endoscope apparatus). For example, when an in vivo image sequence obtained by capturing the inside of a living body has been acquired as the image sequence, the processing section 100 may detect a bubble area or a residue area included in the determination target image as the unnecessary area. The term "bubble area" used herein refers to an area of an image in which bubbles are captured. For example, bubbles may be formed in a living body due to gas produced by the activity of bacteria or the like. The bubble area may be detected using the method disclosed in JP-A-2007-313119, for example. The term "residue area" used herein refers to an area of an image in which a residue is captured. Examples of the residue include undigested food and the like. The residue area may be detected using the method disclosed in JP-A-2010-115413, for example.

The processing section 100 may detect a dark area or a halation area included in the determination target image as the unnecessary area. The term "dark area" used herein refers to an area of an image in which the object cannot be sufficiently observed due to blocked-up shadows. The term "halation area" used herein refers to an area of an image in which the object cannot be sufficiently observed due to blown-out highlights. Such an area is not useful for a process such as diagnosis since it is impossible to observe a useful object within the image even if an object useful for a process such as diagnosis is captured. Therefore, the dark area or the halation area may be determined to be the unnecessary area.

This makes it possible to implement the image summarization process that utilizes the deformation information about images while taking account of the unnecessary area. It is possible to appropriately control the degree by which an object that cannot be observed occurs due to deletion of an image by utilizing the deformation information. In particular, it is possible to suppress a situation in which a lesion is missed when performing the image summarization process on in vivo images captured using an endoscope apparatus. When the unnecessary area is not used, it may be determined that an image that substantially need not be allowed to remain cannot be deleted (see FIGS. 1A and 1B). Such an image can be appropriately deleted by utilizing the unnecessary area (see FIG. 1C). Specifically, it is possible to reduce the number of images included in the summary image sequence as compared with the case where the unnecessary area is not used, and reduce the burden imposed on the user, for example.

The processing section 100 may calculate the coverage area (i.e., an area in which the determination target image is covered by the reference image (an area of the determination target image that is covered by the reference image)) based on the deformation information about the reference image and the determination target image. The processing section 100 may calculate an area of the determination target image that is not included in the coverage area and the unnecessary area to be the loss area.

This makes it possible to calculate the loss area from the coverage area and the unnecessary area (see FIG. 1C or 4), and determine whether or not the determination target image can be deleted. Since the object captured within the coverage area corresponds to (or coincides with (e.g., when the deformation information includes no error (ideal situation))) the object captured within the reference image, the coverage area is an area that is covered even if the determination target image is deleted, by allowing the reference image to remain. On the other hand, the unnecessary area need not be covered since a useful object is not captured within the unnecessary area. Specifically, the loss area is an area that cannot be observed when the determination target image is deleted, and may be useful.

The processing section 100 may calculate the loss ratio of the determination target image with respect to the reference image based on the loss area, and determine whether or not the determination target image can be deleted based on the calculated loss ratio. In this case, the processing section 100 may calculate the ratio of the loss area with respect to the determination target image to be the loss ratio.

This makes it possible to determine whether or not the determination target image can be deleted based on the loss ratio. For example, the ratio of the loss area with respect to the determination target image (i.e., the area ratio of the loss area with respect to the determination target image) may be calculated to be the loss ratio. It is possible to determine whether or not the determination target image can be deleted by performing easy calculations based on the loss area. Note that the loss ratio is information that represents the degree by which the object is lost when the determination target image is deleted (i.e., the degree by which the object cannot be observed even if the reference image is allowed to remain), and is not limited to the ratio and the like.

Note that part or most of the process performed by the image processing device and the like according to the first embodiment may be implemented by a program. In this case, the image processing device and the like according to the first embodiment are implemented by causing a processor (e.g., CPU) to execute a program. More specifically, a program stored in an information storage device is read, and executed by a processor (e.g., CPU). The information storage device (computer-readable device) stores a program, data, and the like. The function of the information storage device may be implemented by an optical disk (e.g., DVD or CD), a hard disk drive (HDD), a memory (e.g., memory card or ROM), or the like. The processor (e.g., CPU) performs various processes according to the first embodiment based on the program (data) stored in the information storage device. Specifically, a program that causes a computer (i.e., a device that includes an operation section, a processing section, a storage section, and an output section) to function as each section according to the first embodiment (i.e., a program that causes a computer to execute the process implemented by each section) is stored in the information storage device.

3. Second Embodiment

The deletion determination process that utilizes the loss area and the structural element is described below. A configuration example of the image processing device according to the second embodiment is the same as that illustrated in FIG. 2 (except for the process performed by the deletion determination section 1005), and detailed description thereof is appropriately omitted. The flow of the process is the same as that illustrated in FIG. 5 (flowchart) (except for the process performed in the step S105), and detailed description thereof is appropriately omitted.

3.1 Deletion Determination that Utilizes Structural Element

Figure 10:
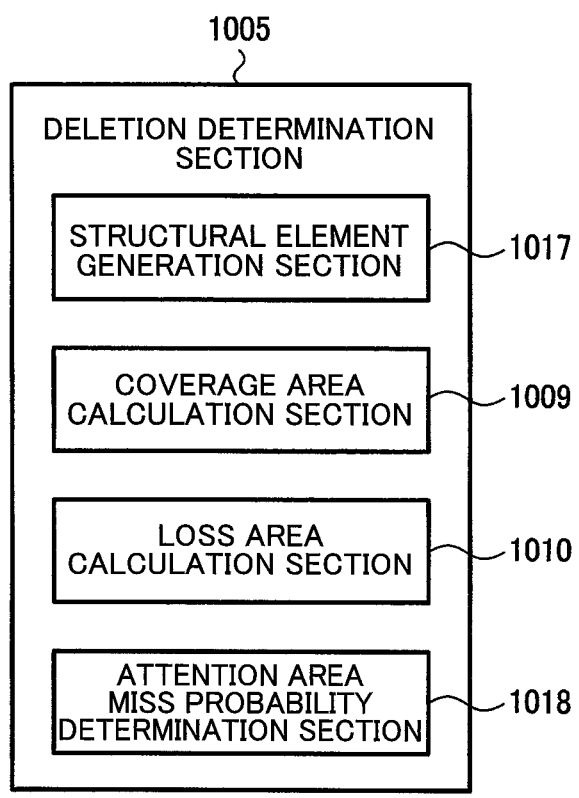
FIG. 10 illustrates another configuration example of a deletion determination section.

The deletion determination process that utilizes the structural element that corresponds to the attention area is described below. As illustrated in FIG. 10, the deletion determination section 1005 may include a structural element generation section 1017, a coverage area calculation section 1009, a loss area calculation section 1010, and an attention area miss probability determination section 1018. Note that the configuration of the deletion determination section 1005 is not limited to the configuration illustrated in FIG. 10. Various modifications may be made, such as omitting some of the elements illustrated in FIG. 10, or adding other elements.

The structural element generation section 1017 generates the structural element used for the process performed by the attention area miss probability determination section 1018 based on the attention area. For example, an area having the same shape and the same size as those of the attention area is set to be the structural element. Note that the structural element is not limited thereto.

The coverage area calculation section 1009 calculates the coverage area, and the loss area calculation section 1010 calculates the loss area based on the coverage area and the unnecessary area.

The attention area miss probability determination section 1018 performs a determination process that determines the probability that the attention area captured within the determination target image is not captured within the reference image (i.e., the attention area is missed) when the determination target image is deleted.

A specific flow of the process is described below. The structural element generation section 1017 generates the structural element based on the attention area. The structural element generation section 1017 sets an area having a size and a shape that should not be missed to be the structural element taking account of a typical size and the like of the attention area. For example, when the attention area is a lesion, and a lesion that is larger than a circle having a diameter of 30 pixels within the image is severe, and should not be missed, a circle having a diameter of 30 pixels is set to be the structural element.

When the reference image and the determination target image have been selected, the deformation information acquisition section 1001 acquires the deformation information about the reference image and the determination target image. The coverage area calculation section 1009 projects the reference image onto the determination target image by utilizing the acquired deformation information to calculate the coverage area. When the coverage area has been calculated, the loss area calculation section 1010 calculates an area of the determination target image that is not included in the coverage area and the unnecessary area to be the loss area.

The attention area miss probability determination section 1018 determines the probability that the attention area is missed. Specifically, the attention area miss probability determination section 1018 performs the erosion process that utilizes the structural element on the loss area to determine whether or not a residual area is present (see FIG. 11).

A specific example of the erosion process is described below with reference to FIGS. 12A to 12F. As illustrated in FIG. 12A, the loss area is necessarily a closed area, and the boundary of the loss area can be set. For example, an outer boundary BO1 and an inner boundary BO2 are set in FIG. 12A.

The erosion process that utilizes the structural element removes the overlapping area of the loss area and the structural element when a reference point of the structural element is set at the boundary of the loss area. For example, when a circular area is set to be the structural element, and the reference point of the structural element is the center of the circle, the erosion process draws a circle so that the center of the circle is situated at the boundary of the loss area, and excludes the overlapping area of the circle and the loss area from the loss area. Specifically, a circle is drawn around a point situated at the outer boundary BO1 of the loss area (see FIG. 12A), and the overlapping area of the circle and the loss area (i.e., the semicircular area indicated by the diagonal lines in FIG. 12A) is excluded from the loss area.

Since the outer boundary BO1 is processed discretely, and includes a plurality of points, the above process may be performed on each point among the plurality of points. For example, a circle may be sequentially drawn around each point situated at the outer boundary BO1 in a given direction (see FIG. 12A), and the overlapping area of each circle and the loss area may be excluded from the loss area.

When part of the boundary of the loss area coincides with the boundary of the determination target image, for example, the loss area may have only a single boundary. In such a case, the above process may be performed on the single boundary. When the loss area has the outer boundary BO1 and the inner boundary BO2 (see FIG. 12A), the above process is performed on the outer boundary BO1 and the inner boundary BO2. Specifically, a circle is drawn around each point situated at the inner boundary BO2 (see FIG. 12B), and the overlapping area of each circle and the loss area is excluded from the loss area.

The size of the loss area decreases through the erosion process. For example, the left part of the loss area illustrated in FIG. 12A is completely deleted (i.e., no residual area is present) by the erosion process performed on the outer boundary BO1 (see FIG. 12A) and the erosion process performed on the inner boundary BO2 (see FIG. 12B). On the other hand, a residual area RE that is not excluded by the erosion process performed on the outer boundary BO1 and the erosion process performed on the inner boundary BO2 occurs in the lower right part of the loss area (see FIG. 12C). Specifically, only the residual area RE remains as a result of performing the erosion process that utilizes the structural element over the entire loss area (see FIG. 12D).

The meaning of the erosion process when using a circle having a radius r as the structural element is discussed below. The loss area (i.e., closed area) is considered to be an area that is surrounded by a boundary (different boundaries (e.g., BO1 and BO2) or a single boundary). When the erosion process is performed on the boundary, a point among the points included in the loss area that is situated at a distance equal to or shorter than r from each point situated at the boundary is determined to be the deletion target. Specifically, the distance from the point included in the residual area (that is excluded from the deletion target) to an arbitrary point situated at the boundary is longer than r. Therefore, a circle having a radius r that is drawn around an arbitrary point within the residual area does not intersect each boundary. This means that the entirety of the attention area represented by a circle having a radius R (=r) that is drawn around a point within the residual area is included within the loss area. Note that the above basic idea is also applied even when the structural element has a shape (e.g., quadrangle) other than a circle.

Figure 12C:
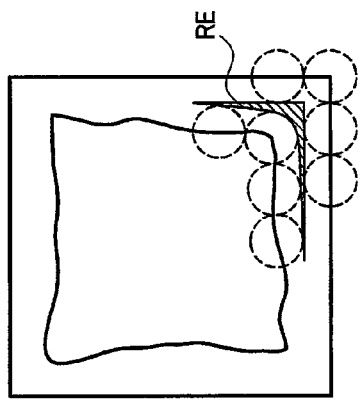
FIGS. 12A to 12F are views illustrating a erosion process that utilizes a structural element and is performed on a loss area.
Figure 12F:
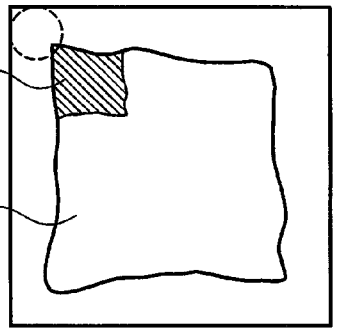
Figure 12B:
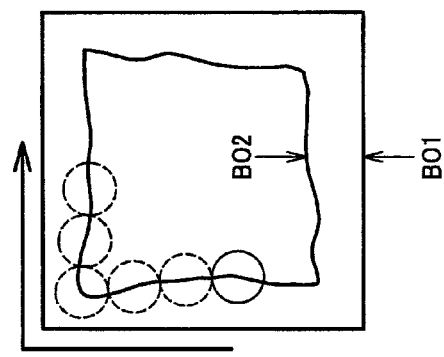
Figure 12E:
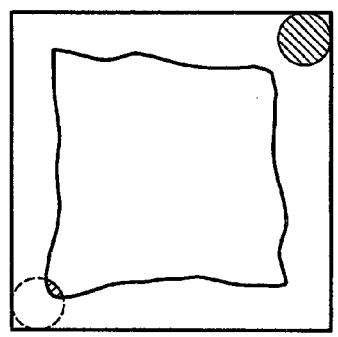
Figure 12A:
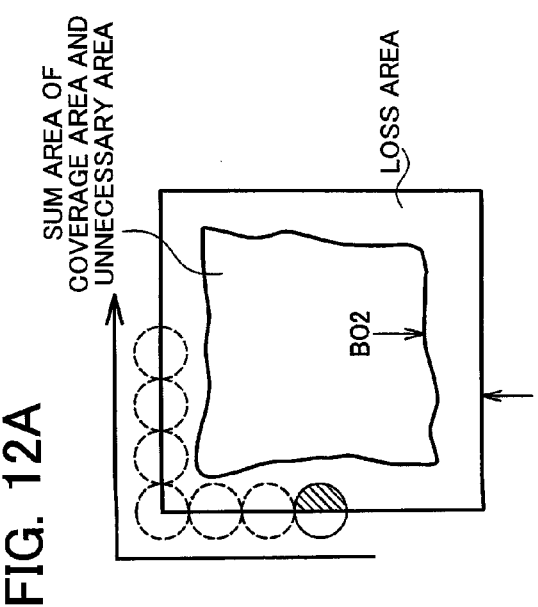
Figure 12D:
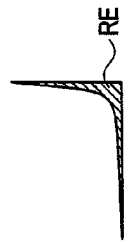

Specifically, when the residual area is present, an area that corresponds to the structural element is included within the loss area (see the lower right part in FIG. 12E). When the attention area (e.g., lesion) is situated at such a position, and the determination target image is deleted, it is likely that the attention area cannot be observed even if the reference image is allowed to remain. When the residual area is not present, at least part of the attention area is included within the coverage area (see the upper left part in FIG. 12E). In this case, at least part of the attention area remains within the reference image even if the determination target image is deleted. It may appear that at least part of the attention area is included within the unnecessary area (see FIG. 12F). However, the attention area is not captured within the unnecessary area. Therefore, it is unnecessary to take account of the probability that the attention area is present at the position within the determination target image that is indicated by the dotted line in FIG. 12F (i.e., the attention area is not missed even if the determination target image is deleted).

Accordingly, the attention area miss probability determination section 1018 performs the erosion process that utilizes the structural element on the loss area, and determines whether or not the determination target image can be deleted based on whether or not the residual area is present.

Figure 13A:
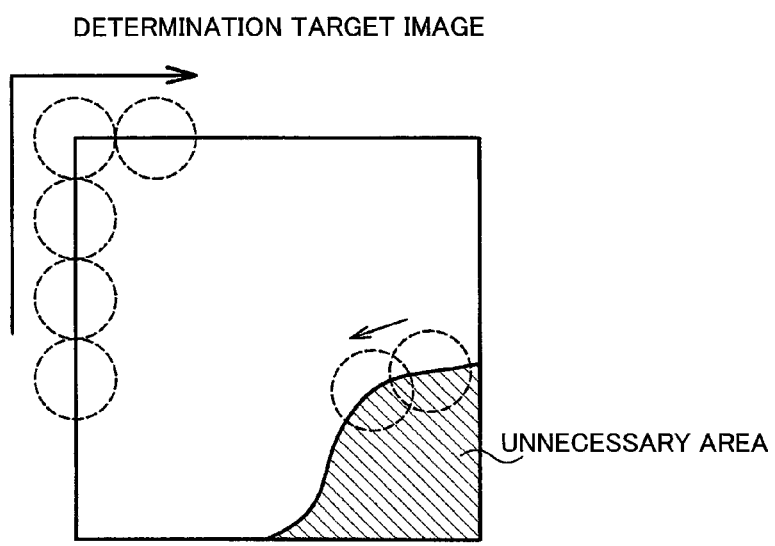
FIGS. 13A and 13B are views illustrating a erosion process that utilizes a structural element and is performed on an area of a determination target image other than an unnecessary area.
Figure 13B:
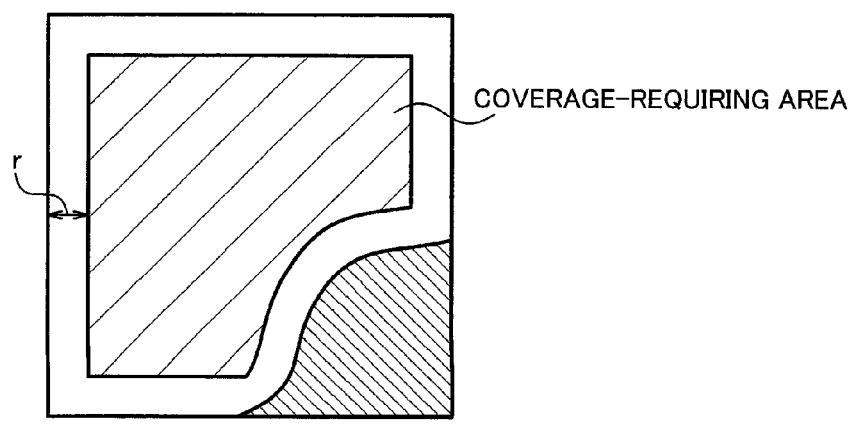
Figure 14A:
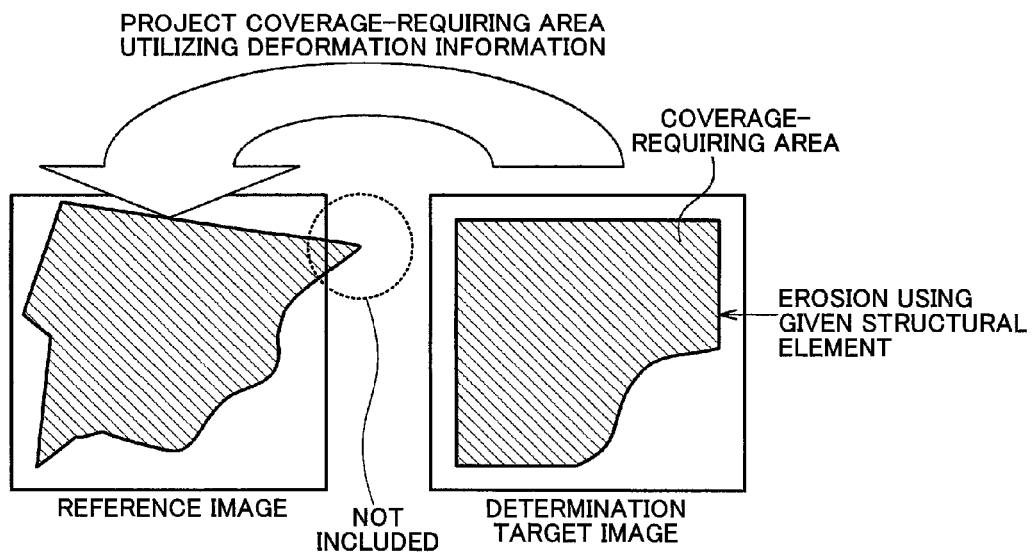
FIGS. 14A and 14B illustrate an example of an inclusion determination process performed on a reference image and a coverage-requiring area.
Figure 14B:
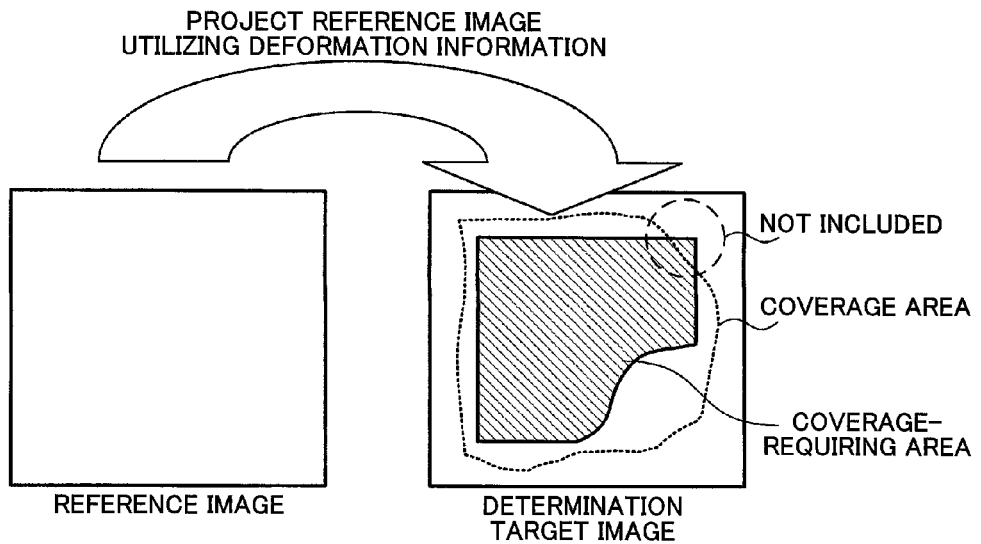

Note that the target of the erosion process that utilizes the structural element is not limited to the loss area. For example, the erosion process that utilizes the structural element may be performed on an area of the determination target image other than the unnecessary area (see FIG. 13A). In this case, a coverage-requiring area that must be covered by the reference image remains (see FIG. 13B) by setting the structural element so that the entirety of the attention area is not included within the area that is removed by the erosion process (e.g., setting an element having a size twice that of the attention area as the structural element). Specifically, whether or not the determination target image can be deleted may be determined based on whether or not the entirety of the coverage-requiring area is covered by the reference image. More specifically, one of the reference image and the coverage-requiring area may be deformed using the deformation information, and the inclusion determination process may be performed using the deformed area (see FIGS. 14A and 14B). The determination target image can be deleted when the coverage-requiring area is included within the reference image, and cannot be deleted when the entirety of the coverage-requiring area is not included within the reference image.

Figure 15A:
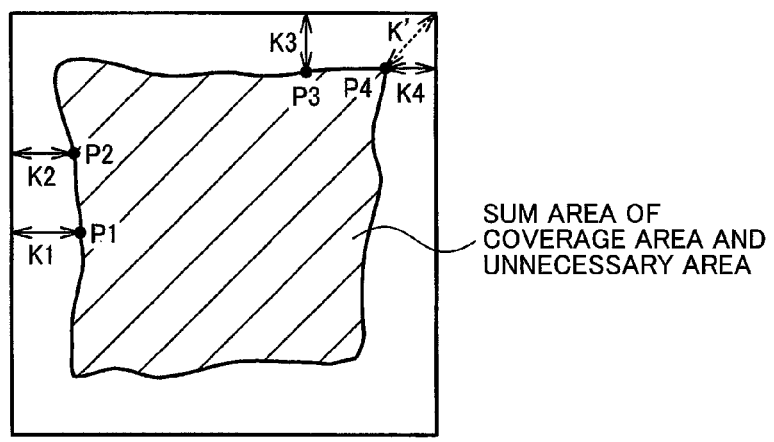
FIGS. 15A and 15B are views illustrating another process that utilizes a structural element.
Figure 15B:
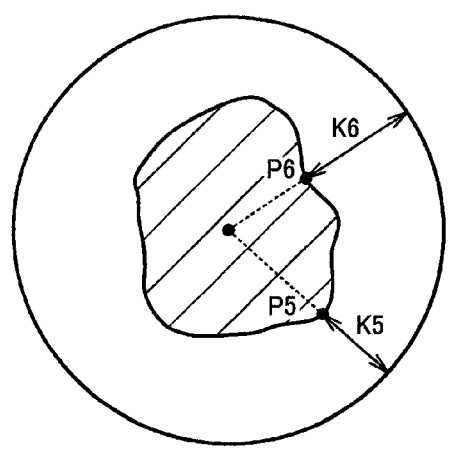

The deletion determination process that utilizes the structural element is not limited to the deletion determination process that utilizes the erosion process. It suffices that the deletion determination process that utilizes the structural element determine whether or not the structural element is included within the loss area. For example, the deletion determination process that utilizes the structural element may be implemented using a simple method that calculates a value that corresponds to the maximum size (diameter) of the loss area based on the distance (e.g., k1 to k6) from the point (e.g., p1 to p6) at the boundary of the sum area of the coverage area and the unnecessary area to the boundary of the determination target image, or the distance from the point at the boundary of the determination target image to the boundary of the sum area, and compares the calculated value with the minimum size (diameter) of the structural element (e.g., a structural element having the same size as that of the attention area) (see FIGS. 15A and 15B). Note that FIG. 15A illustrates an example in which the determination target image has a square shape, and FIG. 15B illustrates an example in which the determination target image has a circular shape.

3.2 Modifications of Deletion Determination

The deletion determination process may be implemented by the process that utilizes the loss ratio, or the process that utilizes the structural element, as described above. Note that the deletion determination process need not necessarily be implemented by independently using the process that utilizes the loss ratio, or the process that utilizes the structural element. The process that utilizes the loss ratio and the process that utilizes the structural element may be used in combination.

For example, the deletion determination process may be implemented by performing both the process that utilizes the loss ratio, and the process that utilizes the structural element. In this case, it may be determined that the determination target image can be deleted when it has been determined that the determination target image can be deleted by the determination process based on the loss ratio and the determination process based on the structural element, otherwise it may be determined that the determination target image cannot be deleted, in order to prevent a situation in which an area that cannot be observed occurs, and prevent a situation in which the attention area is missed to improve the utility of the summary image sequence.

According to the second embodiment, the processing section 100 determines the probability that the attention area included in the determination target image is missed using the loss area, and determines whether or not the determination target image can be deleted based on the probability that the attention area is missed.

The term "attention area" used herein refers to an area for which the observation priority for the user is relatively high as compared with other areas. For example, when the user is a doctor, and desires to perform treatment, the term "attention area" used herein refers to an area in which a mucous membrane area or a lesion area is captured.

If the doctor desires to observe bubbles or feces, the term "attention area" used herein refers to an area that includes a bubble area or a feces area. In this case, bubbles or a residue is an useful object for observation, and a bubble area or a residue area is not considered to be the unnecessary area. Specifically, the attention area for the user differs depending on the objective of observation, but is necessarily an area for which the observation priority for the user is relatively high as compared with other areas.

This makes it possible to determine whether or not the determination target image can be deleted from the viewpoint of the probability that the attention area is missed. It is determined that the determination target image cannot be deleted when the attention area is not missed unless the determination target image is deleted, but is missed due to deletion of the determination target image even if the reference image is allowed to remain. The probability that the attention area is missed may be determined using various methods. For example, it may be determined that the attention area may be missed when the attention area is captured within the determination target image to have a large size, but may be captured within the reference image to have a small size (or may not be captured within the reference image).

The processing section 100 may determine the probability that the attention area included in the determination target image is missed by determining whether or not an area having a size corresponding to the attention area is included within the loss area.

This makes it possible to determine the probability that the attention area is missed based on the inclusion relationship between the loss area and an area having a size corresponding to the attention area, and determine whether or not the determination target image can be deleted. The loss area refers to an area that cannot be observed when the determination target image is deleted, even if the reference image is allowed to remain, and may include the attention area since it does not correspond to the unnecessary area. Specifically, a case where an area having a size corresponding to the attention area is included within the loss area corresponds to a case where the attention area having a given size is captured within the determination target image, but may not be captured within the reference image. In this case, it is determined that the determination target image cannot be deleted since the attention area may be missed. On the other hand, when an area having a size corresponding to the attention area is not included within the loss area, at least part of the attention area captured within the determination target image is necessarily captured within the reference image. Therefore, it is determined that the determination target image can be deleted.

The processing section 100 may perform the erosion process that utilizes the structural element that corresponds to the attention area on the loss area. The processing section 100 may determine that the determination target image cannot be deleted since the attention area may be missed when the residual area is present as a result of the erosion process. The processing section 100 may determine that the determination target image can be deleted since the attention area is not missed when the residual area is not present as a result of the erosion process.

The term "structural element" used herein refers to an element that represents the processing unit used for the erosion process. For example, the structural element is the circular element illustrated in FIG. 12A and the like. The term "erosion process" used herein refers to a process that deletes an area corresponding to the structural element from the processing target area (see FIGS. 12A to 12F).

This makes it possible to accurately determine whether or not the entirety of the structural element (e.g., a structural element having the same size as that of the attention area) is included within the loss area. The presence or absence of the residual area corresponds to whether or not the entirety of the structural element is included within the loss area (see FIGS. 12A to 12F). Since whether or not the entirety of the structural element is included within the loss area is strictly determined, the accuracy of the determination as to whether or not the determination target image can be deleted, can be improved as compared with the method described above with reference to FIGS. 13A to 15B, for example. Note that the method described above with reference to FIGS. 13A to 15B may be used when it is important to reduce the processing load, for example.

The processing section 100 may perform the determination based on the loss ratio, and the determination on the loss area that utilizes the structural element, in combination (see the modifications).

The first and second embodiments according to the invention and the modifications thereof have been described above. Note that the invention is not limited thereto. Various modifications and variations may be made of the first and second embodiments and the modifications thereof without departing from the scope of the invention. A plurality of elements described above in connection with the first and second embodiments and the modifications thereof may be appropriately combined to implement various configurations. For example, an arbitrary element may be omitted from the elements described above in connection with the first and second embodiments and the modifications thereof. Elements among the elements described above in connection with the first and second embodiments and the modifications thereof may be appropriately combined. Any term cited with a different term having a broader meaning or the same meaning at least once in the specification and the drawings can be replaced by the different term in any place in the specification and the drawings. Specifically, various modifications and applications are possible without materially departing from the novel teachings and advantages of the invention.

What is claimed is:

1. An image processing device comprising:
   an image sequence acquisition section that acquires an image sequence that includes a plurality of constituent images, the image sequence being an image sequence for observing a target object; and
   a processing section that performs an image summarization process that deletes some of the plurality of constituent images included in the image sequence acquired by the image sequence acquisition section to generate a summary image sequence,
   wherein the processing section selects a reference image and a determination target image from the plurality of constituent images, detects an unnecessary area from the determination target image, the unnecessary area being an area in which the target object is not sufficiently captured enough to be observed, calculates a loss area based on deformation information about the reference image and the determination target image, and the unnecessary area, the loss area being an area that is lost when the determination target image is deleted, and determines whether or not the determination target image can be deleted based on the calculated loss area.

2. The image processing device as defined in claim 1,
   wherein the processing section calculates a coverage area based on the deformation information about the reference image and the determination target image, the coverage area being an area in which the determination target image is covered by the reference image, and calculates an area of the determination target image that is not included in the coverage area and the unnecessary area to be the loss area.

3. The image processing device as defined in claim 1,
   wherein the processing section calculates a loss ratio based on the loss area, the loss ratio representing a ratio of an area that is lost when the determination target image is deleted, and determines whether or not the determination target image can be deleted based on the calculated loss ratio.

4. The image processing device as defined in claim 3,
   wherein the processing section calculates a ratio of the loss area with respect to the determination target image to be the loss ratio.

5. The image processing device as defined in claim 1,
wherein the processing section determines a probability that an attention area included in the determination target image is missed using the loss area, and determines whether or not the determination target image can be deleted based on the probability that the attention area is missed.

6. The image processing device as defined in claim 5,
wherein the processing section determines the probability that the attention area included in the determination target image is missed by determining whether or not an area having a size corresponding to the attention area is included within the loss area.

7. The image processing device as defined in claim 5,
wherein the processing section performs an erosion process that utilizes a structural element that corresponds to the attention area on the loss area, determines that the determination target image cannot be deleted when it has been determined by the erosion process that a residual area is present, and that the attention area may be missed, and determines that the determination target image can be deleted when it has been determined by the erosion process that the residual area is not present, and that the attention area is not missed.

8. The image processing device as defined in claim 1, wherein:
the image sequence is an in vivo image sequence obtained by performing image capturing inside of a living body, and
the processing section detects a bubble area or a residue area included in the determination target image as the unnecessary area.

9. The image processing device as defined in claim 1,
wherein the processing section detects a dark area or a halation area included in the determination target image as the unnecessary area.

10. An information storage device storing a program that causes a computer to function as:
an image sequence acquisition section that acquires an image sequence that includes a plurality of constituent images, the image sequence being an image sequence for observing a target object; and
a processing section that performs an image summarization process that deletes some of the plurality of constituent images included in the image sequence acquired by the image sequence acquisition section to generate a summary image sequence,
wherein the processing section selects a reference image and a determination target image from the plurality of constituent images, detects an unnecessary area from the determination target image, the unnecessary area being an area in which the target object is not sufficiently captured enough to be observed, calculates a loss area based on deformation information about the reference image and the determination target image, and the unnecessary area, the loss area being an area that is lost when the determination target image is deleted, and determines whether or not the determination target image can be deleted based on the calculated loss area.

11. An image processing method comprising:
acquiring an image sequence that includes a plurality of constituent images, the image sequence being an image sequence for observing a target object;
selecting a reference image and a determination target image from the plurality of constituent images;
detecting an unnecessary area from the determination target image, the unnecessary area being an area in which the target object is not sufficiently captured enough to be observed;
calculating a loss area based on deformation information about the reference image and the determination target image, and the unnecessary area, the loss area being an area that is lost when the determination target image is deleted;
determining whether or not the determination target image can be deleted based on the calculated loss area; and
performing an image summarization process that deletes some of the plurality of constituent images included in the image sequence based on a result of the determination as to whether or not the determination target image can be deleted to acquire a summary image sequence.

* * * * *